US008915513B2

(12) United States Patent
Garcia França

(10) Patent No.: US 8,915,513 B2
(45) Date of Patent: Dec. 23, 2014

(54) REVERSER MECHANISM APPLIED TO THE REAR AXLE OF A WHEELCHAIR

(76) Inventor: Jefferson Garcia França, São Paulo (BR)

( * ) Notice: Subject to any disclaimer, the term of this patent is extended or adjusted under 35 U.S.C. 154(b) by 0 days.

(21) Appl. No.: 13/982,811

(22) PCT Filed: Feb. 1, 2011

(86) PCT No.: PCT/IB2011/050441

§ 371 (c)(1),
(2), (4) Date: Jul. 31, 2013

(87) PCT Pub. No.: WO2012/104677

PCT Pub. Date: Aug. 9, 2012

(65) Prior Publication Data

US 2013/0307244 A1 Nov. 21, 2013

(51) Int. Cl.

*A61G 5/10* (2006.01)
*B62M 1/14* (2006.01)
*A61G 5/02* (2006.01)

(52) U.S. Cl.

CPC ................ *A61G 5/022* (2013.01); *A61G 5/021* (2013.01)
USPC ...................... 280/304.1; 280/237; 280/250.1

(58) Field of Classification Search

CPC ............. A61G 5/00; A61G 5/08; A61G 5/10; A61G 5/12; A61G 2005/128; A61G 2005/1054; A61G 2005/1089
USPC ............................ 280/250.1, 304.1, 236, 237
See application file for complete search history.

(56) References Cited

U.S. PATENT DOCUMENTS

| | | | | | |
|---|---|---|---|---|---|
| 5,743,544 | A * | 4/1998 | Weaver | ......................... | 280/249 |
| 5,846,154 | A * | 12/1998 | Godin | ........................... | 475/331 |
| 7,780,179 | B2 * | 8/2010 | Brown | .......................... | 280/246 |
| 2009/0039612 | A1 * | 2/2009 | Bidwell et al. | ............ | 280/250.1 |
| 2009/0273156 | A1 * | 11/2009 | Byun | ........................ | 280/250.1 |

FOREIGN PATENT DOCUMENTS

| | | |
|---|---|---|
| BR | PI0502550-8 | 6/2005 |
| DE | 29 29 138 A1 | 2/1981 |
| WO | WO 2008/146136 A2 | 12/2008 |

OTHER PUBLICATIONS

"Rowheel Wheelchair Propulsion System", Salim Nasser (Jun. 19, 2010), available at http://contest.techbriefs.com/2010/entries/medica1/589-rowheel-wheelchair-propulsion-system.*
International Search Report of PCT/IB2011/050441, Oct. 19, 2011.

* cited by examiner

*Primary Examiner* — Joseph M Rocca
*Assistant Examiner* — Marc A Scharich
(74) *Attorney, Agent, or Firm* — Collard & Roe, P.C.

(57) ABSTRACT

A reverser mechanism particularly developed to provide better posture to the wheelchair user and a more efficient propulsion during a forward movement (wheelchair touch) by means of the application of a traction force to the handrims, which is contrary to the rotating movement of the rear wheels (movement contrary to the propulsion), allowing the wheelchair user to adopt a more comfortable and straight position during the effort made to move the wheelchair forward.

5 Claims, 7 Drawing Sheets

REVERSER MECHANISM APPLIED TO THE REAR AXLE OF A WHEELCHAIR

CROSS REFERENCE TO RELATED APPLICATIONS

This application is the National Stage of PCT/IB2011/050441 filed on Feb. 1, 2011. The international application under PCT article 21(2) was published in English.

TECHNICAL FIELD

This invention relates to a reverser mechanism applied to the rear axle of a wheelchair. The reverser mechanism promotes the postural adjustment of the wheelchair user by applying a force contrary to the rotational movement of the wheels, thereby enabling the wheelchair user to adopt a more comfortable (adequate) and straight position during the effort made to move forward and backward.

BACKGROUND ART

As it is generally known, wheelchairs are classified in accordance with their propulsion type, that is, manual or motorized. Motorized wheelchairs usually have higher costs of acquisition and maintenance, while manual propulsion wheelchairs require human effort to move; that is, they are propelled by manual impulsion applied either by an auxiliary person or by the user itself, who applies force onto the handrims, i.e., the circular frame attached to the external side of the rear wheels.

However, the handling and rotating movement of handrims require the moving force to be applied by the wheelchair user, who uses the front muscles of the torso and upper limbs, that is, pectoral muscles, biceps, deltoid anterior, serratus, and brachial.

The improper movement of said muscles may cause lesions and deformities in the body of the wheelchair user. The correct posture for a wheelchair user includes some rules, starting with the torso, which must be kept perpendicular, centralized, leveled, or slightly inclined forward, but preventing lateral inclinations or rotations. The legs must be in an angle of 90° to the hip, with the knees and ankles flexed to provide better stability and weight distribution. The feet must be parallel to each other. After the pelvis is stabilized, the torso must be straight and centralized, with the vertebral spine in its natural, physiological curves. The head must be straight and facing forward, supported by the neck. The upper limbs must be parallel to the torso, extended to the sides, with the elbows flexed at 90°.

Therefore, the position adopted by the wheelchair user to perform the constant movement of the wheelchair frequently causes the front abdominal muscles to be overused. This is because to move the chair forward using the handrims, the user must push them forward, causing the wheels to turn clockwise when seen by an external observer. This movement leads to an incorrect posture, as the user needs to push the torso forward and raise the elbows to produce the effort downward and forward.

This constant effort leads to a bad posture of the spine, muscle deformities, problems in the digestive system, deficiency in motor skills, lower breathing capacity, appearance of pressure ulcers, and pain that, on its turn, reflect directly in the psycho-social aspect of the wheelchair user, negatively changing its quality of life.

On the other hand, when the wheelchair user wants to move the chair backwards, the user leans on the back of the chair with the hands on the handrims, pulling them backwards, that is, pulling the wheels and turning them counterclockwise. This posture perfectly fits in the definition described above for the correct angles formed between the spine, hip, legs, and feet.

BACKGROUND OF THE INVENTION

Brazilian Patent Application BR PI 0502550-8 filed by the applicant of the present invention, describes an inverse propulsion mechanism applied to a wheelchair that assists in the maintenance of a better position of the wheelchair user during backward or forward movements. The mechanism is installed on the axles of the wheels and thereby allows the wheelchair user to apply force in the contrary direction to the movement of the wheel onto the support structure installed on the perimeter profile of the wheels. This way, a displacement force is applied in which the practical result is the effort of the posterior muscle-skeleton structure, which is more appropriate to receive the physical effort transferred by the upper limbs.

The mechanism of this document comprehends a set of gears that work as planetary gears, transmitting the movement to the axles of the rear wheels when a given effort is applied to the handrims.

SUMMARY OF THE INVENTION

Recently, in order to optimize the movement of wheelchairs, the applicant improved the propulsion mechanism particularly developed for the wheelchair user to maintain the correct posture when moving the chair forward, and a more efficient propulsion. With the mechanism installed on the rear axles of the wheelchair, the user has the option to apply force in the counterclockwise direction, which maintains the user with its spine supported by the back of the chair, thereby inverting the conventional propulsion movement. If the user wants to move the wheelchair backwards to make maneuvers, the effort must be applied forward (clockwise), as the reverser mechanism inverts the rotation of the wheels, that is, the movement is inversely proportional to the impulsion.

To make the movements described above, the reverser mechanism also has a locking system controlled by the user. As the device is installed on the axle of the wheelchair, it is kept unlocked in order to operate, allowing the user to move the wheelchair forward by pulling the handrims backwards (counter clockwise), that is, the wheels operate in reverse mode (movement contrary to impulsion). When locked, the system transforms the wheels of the wheelchair into a conventional chair.

This reverse mechanism is configured by a fixed rotating module attached to the axle of the rear wheel and a directional rotating module that is part of said rotating module and is fixed by a set of planetary gears. The directional rotating module includes a fixation device to be coupled to the handrim of the rear wheel.

Both the fixed rotating module and the directional rotating module are axial, and the fixed rotating module is configured by a hub in revolution "H" profile, whose central wall has an orthogonal projection for the coupling of the wheel axle. The central wall provides the formation of independent chambers. A gear receiving the planetary set is assembled in the front chamber, which also receives the directional rotating module.

On its turn, the directional rotating module is comprised of a structural disk with flat base (hub cap) from which a pair of concentric tubular projections develop, while a transmission gear of the planetary set is assembled (fixed) onto the flat base.

The transmission and reception gears are interconnected by means of satellite gears (coupled to the axle), which transmit the reverse rotating movement to the fixed rotating module and, consequently, the linear forward movement (inverted) of the wheelchair.

The directional rotating module includes a locking device configured by engagement pins that couple in grooves existing in intermediary elements and tubular projection of the wheel hub.

Therefore, when the directional rotating module is unlocked from the fixed module, its movement will occur in the normal direction, that is, counter clockwise, moving the wheelchair forward (movement contrary to the impulsion). When the directional rotating module is locked to the fixed module, the movement will be clockwise and conventional (movement in the same direction as the impulsion).

OBJECTIVES AND ADVANTAGES OF THE INVENTION

Therefore, the main objective is to enable the wheelchair user to have better posture during the use of wheelchairs in the forward direction, which is usually the more common direction followed by the wheelchair user and, therefore, should be accomplished with the torso and hips in appropriate angular position.

The main advantage of the improvement proposed herein resides in the fact that the new configuration of the mechanism enables the handling of the wheelchair in a one-to-one proportion, that is, one turn of the handrim generates one turn of the wheel, differently from prior devices, which worked in the three-to-one proportion, that is, three turns in the handrim for one turn of the wheel. This is due to the fact that this new mechanism has conical gears placed in a different fashion, is more robust than the previous method proposed by the same applicant, and enables the gears to move with better precision, obtaining the reverse displacement of the rear wheels in a smooth, harmonious, and safe way, preventing any unbalance to the wheelchair user.

Another advantage of the installation of this mechanism to the wheelchair is that it collaborates with the pelvic stability of the wheelchair user, reducing the risk of pressure ulcers in the ischial (gluteus) region and providing more efficient propulsion to the wheelchair by making use of the posterior muscles, which are more appropriate to this type of activity. The user will have better output, that is, better quality in the impulsion force and consequently better movement with less physical wearing, and more balanced muscles in the upper limbs, thereby reducing the risk of lesions, which finally collaborates with the physical and psychological conditions of the user, allowing for the user's reinclusion in society.

BRIEF DESCRIPTION OF DRAWINGS

To complement this description, and in order to provide better understanding of the characteristics of the invention, and according to the preferred embodiment of the invention, this description is accompanied with a set of drawings attached hereto, which provides examples, without limitation, and represent the following:

FIG. 7 shows a side view of a user on the wheelchair equipped with the reverser mechanism unlocked, whereas the movement of the handrims is counter clockwise (pulled backwards), in direction contrary to the movement, while FIG. 8 shows the movement of the set of planetary gears responsible for inverting the rotation, causing the wheels to turn in forward;

FIG. 10 shows the user on the wheelchair equipped with the reverser mechanism in the locked position. In this position, the movement of the handrims occurs in the clockwise direction (usual), while FIG. 11 shows that the set of planetary gears is unified, causing the handrims and the wheels to turn in the same direction forward.

DETAILED DESCRIPTION OF THE INVENTION

Figure 2:
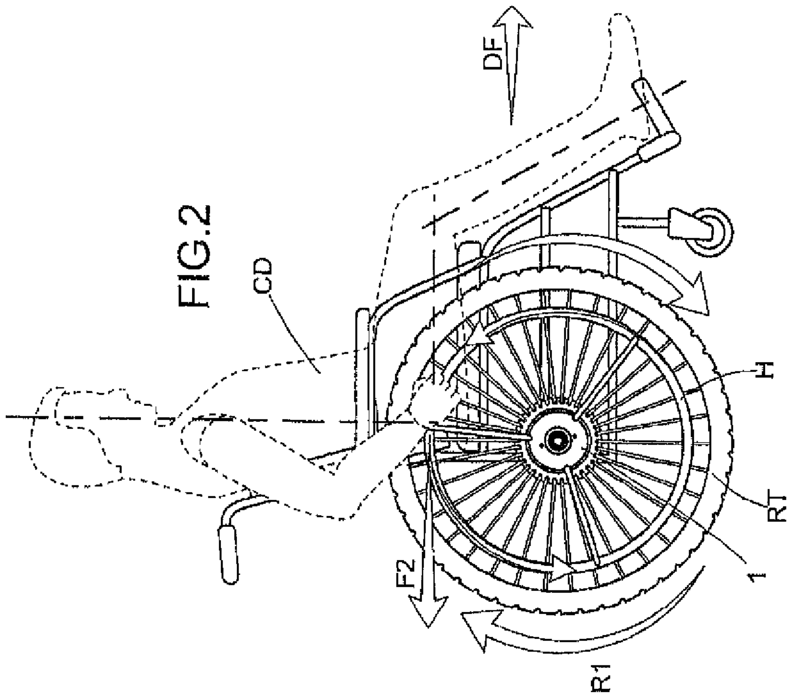
FIG. 2 shows another side view, now with the wheelchair equipped with the reverser mechanism (1) of the present invention, where it is possible to see that the user maintains the spine supported by the back of the chair when moving the handrim backwards (F2), allowing the wheel to move forward (DF)

With references to the drawings, this invention is denominated as A REVERSER MECHANISM APPLIED TO THE REAR AXLE OF WHEELCHAIRS. More precisely, the invention is a reverser mechanism (1) particularly developed to provide better posture to the wheelchair user (CD) and a more efficient impulsion during forward movements (DF) (wheelchair touch) through the application of a traction force (F2) on the handrims (H) that is contrary to the rotating movement (R1) of the rear wheels (RT), allowing the wheelchair user (CD) to adopt a more adequate and straight position during the effort (F2) applied to move forward.

The reverser mechanism (1) is assembled on the hub (2) of each of the rear wheels (RT) of the chair and is configured by a drive module (3) and the wheel hub itself structurally modified to conform the directional rotating module (2), whereas when modules (2) and (3) are unlocked from each other, the mechanism operates in reverse motion, that is, for the wheels (RT) to move the chair forward (DF), a traction force (F2) is applied to the handrims (H) (movement contrary to the impulsion), and when modules (2) and (3) are locked to each other, the wheelchair has conventional propulsion (movement in the same direction as the impulsion), that is, an impulsion force (F1) is applied for the wheelchair to move forward (DF). Both the directional rotating module (2) and the drive module (3) are concentric in relation to the rear axle (E).

The drive module (3) is formed by a front cylindrical bearing (3*a*), to whose external periphery the handrim (H) support bars (h1) are fixed, while another cylindrical segment (3*b*) is provided internally and concentrically to the bearing (3*a*) and interconnected thereto by a posterior wall (3*c*) containing with at least two orifices (3*d*) that are crossed by the locking pins (5*a*). This lock, on its turn, is housed with a spring (M) between the cylindrical segments (3*a*) and (3*b*). This lock (5) operates in the coupling/decoupling movement between the directional rotating module (2) and the drive module (3) described below.

Said directional rotating module (2) is configured by a cylindrical hub (2*a*) that has an internal wall (2*b*) centrally crossed by a short cylindrical segment (2*c*), whose front face has multiple cylindrical grooves (2*f*) and whose internal surface receive bearings (R) and a spacer (Es) for the centered movement of the module (2) in relation to the axle (E). The ends of the hub (2*a*) are equipped with orthogonal flanges (2*d*) that contain multiple orifices (2*e*) for the assembly of the sprokes (RA) of the rear wheel (RT).

Said internal wall (2*b*) divides the inside of the hub (2*a*) into two independent chambers. The front chamber (CF) receives the set of planetary gears (4) that has one of the gears referred to as the receiving gear (4A) fixed to the wall (2*b*) by means of bolts (P1). The other chamber, the rear chamber (CP) is free.

Figure 8:
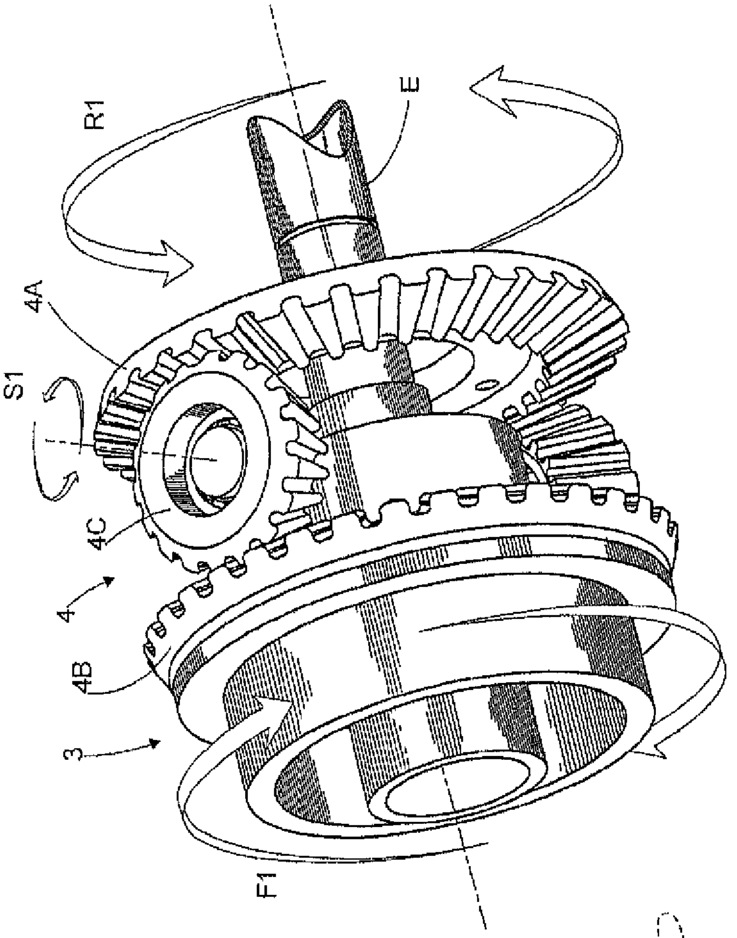
FIGS. 7 and 8 are complementary views.

The set of planetary gears (4) is formed by receiving gear (4A) and another identical and mirrored, transmission gear (4B), which are interconnected by two or more satellite gears (4C) of pinion type, fixed to a central hub (4D) by pins (P2) and bearings (R2). Gears (4C) are responsible for transmitting the retrograde rotating movement (S1) when a traction force (F2) is applied to the handrim (H), or are kept locked between the gears (4A) and (4B) to create a block (BL) that receives the impulsion force (F1) when the usual movement is desired (see FIGS. 8 and 10). In any circumstance, the set of planetary gears (4) promotes the movement of the wheelchair (CD).

A drive disk (6) having an "S"-shaped profile is assembled between the internal face of the transmission gear (4B) and the end flange (FL) of the axle (E), while the flange with larger diameter is equipped with multiple grooves (6*a*) that accommodate the ends of the pins (5*a*) of the lock (5) and at least two pins (6*b*) that accommodate and slide along groves (2*g*) of the hub (4D) to engage or disengage the pins (6*a*) from the groves (2*f*) made on the peripheral edge of the orthogonal projection (2*c*). The flange with smaller diameter of the disk (6) operates as a stopper to an expanding spring (M1) which is anchored on the flange (FL) of the axle (E).

Figure 6:
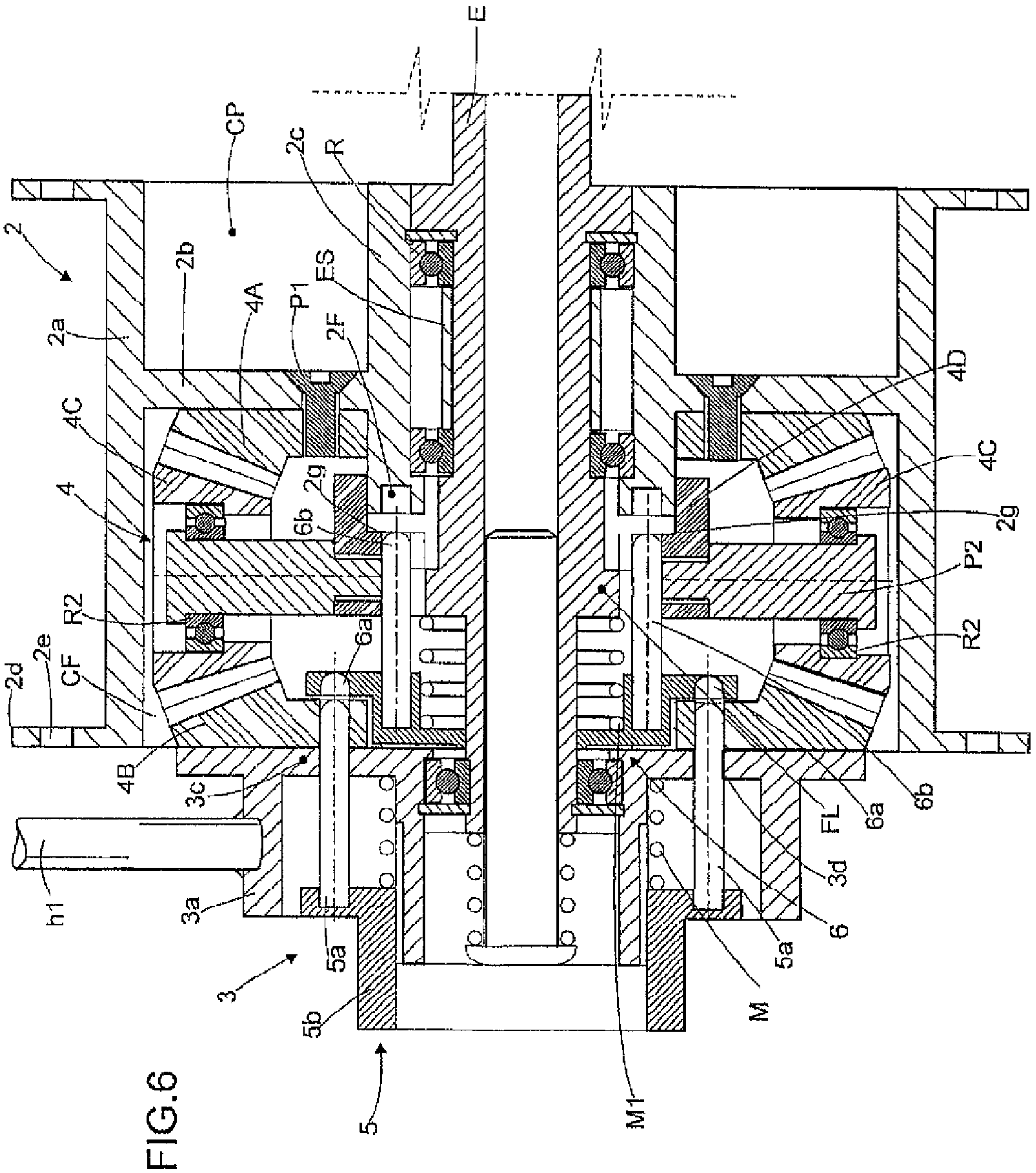
FIG. 6 shows a cross section of the reverser mechanism unlocked, so as to enable the handrims to be pulled backwards, moving the wheelchair forward (counter clockwise) and, when moved forward, move the wheelchair backward.
Figure 7:
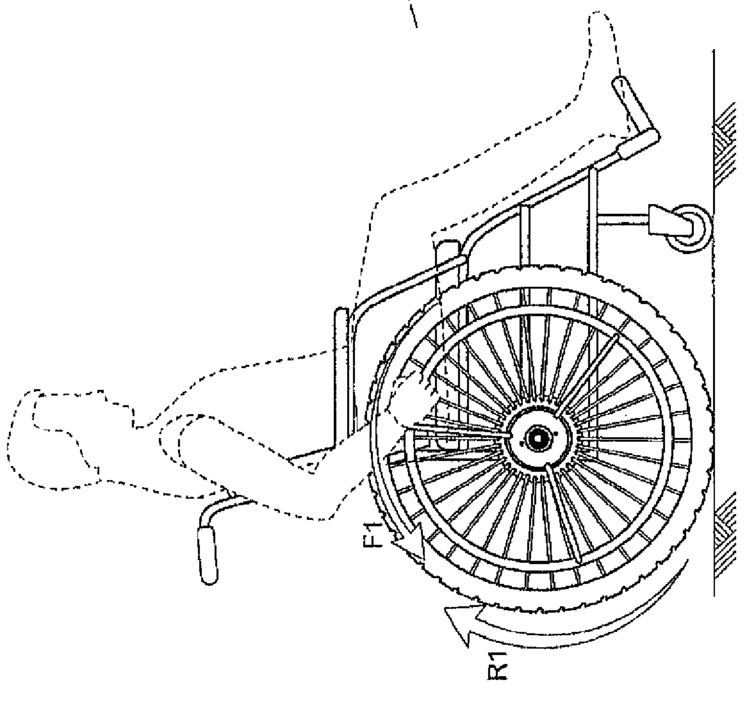
Figure 9:
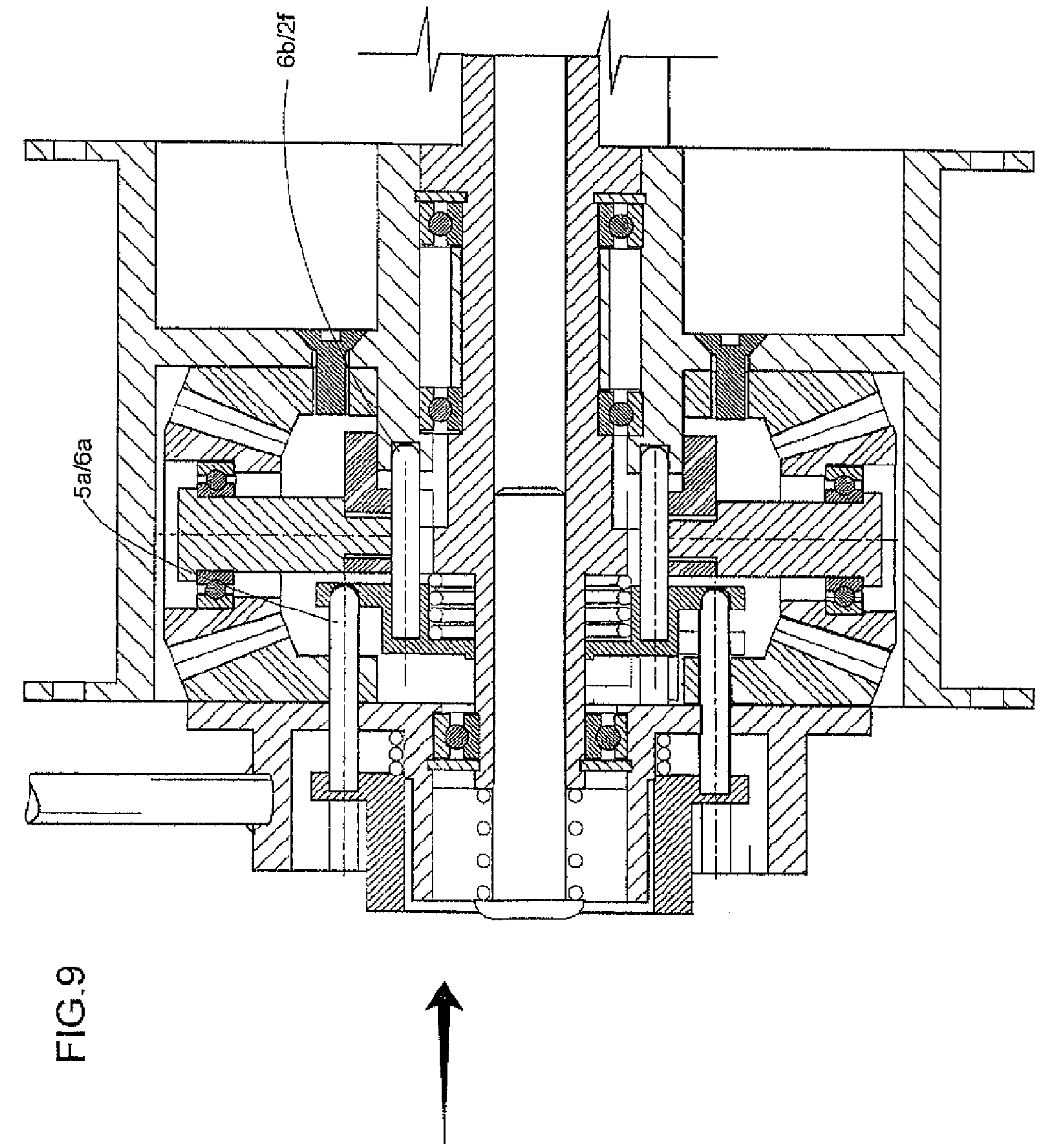
FIG. 9 shows a cross section of the reverser mechanism locked, so as to enable the handrims to be pulled forward (conventionally), moving the wheelchair forward and, when moved backwards, move the wheelchair backward.
Figure 11:
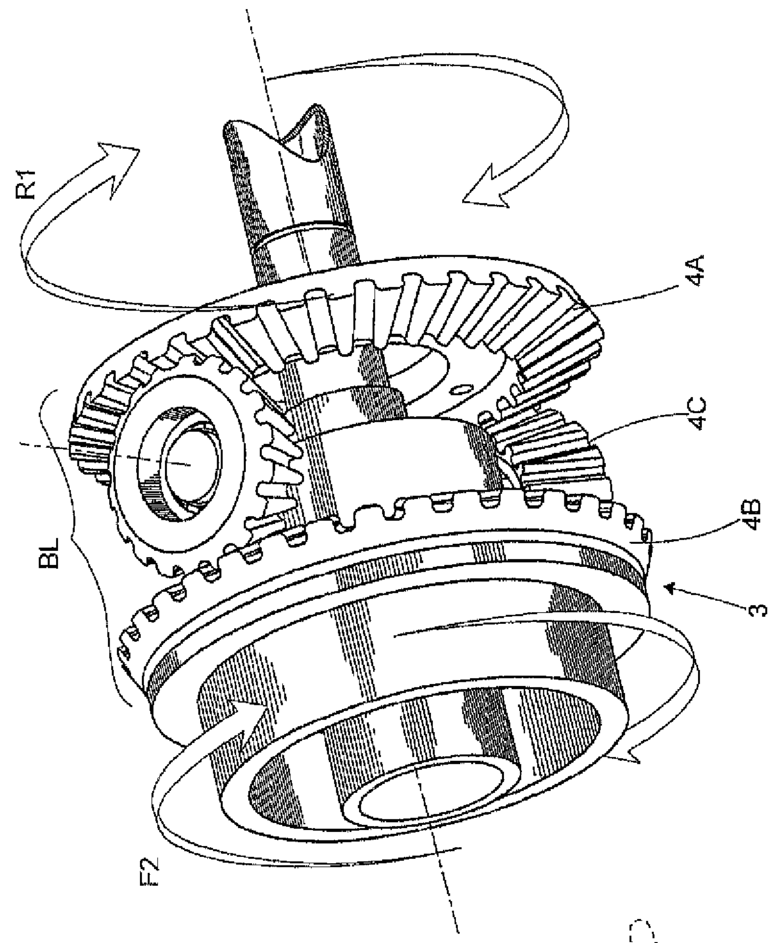
FIGS. 10 and 11 are also complementary figures.

When in resting position (FIG. 6), drive button (5*b*) allows the traction force (F2) applied to the handrim and rods (h1) to rotate the module (3) and consequently, rotate the transmission gear (4B), as the pins (5*a*) are coupled to the orifices (7), thereby enabling the transmission gear (4B) to rotate and apply movement (S1) to the satellite gears (4C), which, on their turn, transmit the rotation to gear (4A), which is inverted in relation to gear (4B). As gear (4A) is fixed to the hub or directional rotating module (2), the wheelchair moves forward (DF) (see FIGS. 2, 7, and 8).

Figure 1:
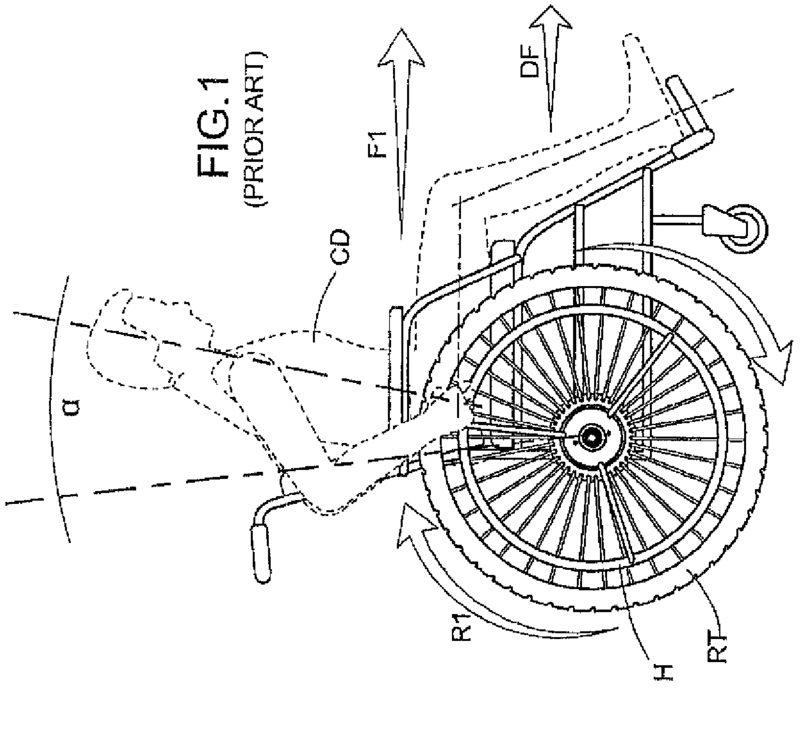
FIG.1 (PRIOR ART)
FIG. 1 represents the state of the prior art in a side view, indicating the usual method of impulsion (F1) using the handrims (H), where it is possible to observe the pendulum movement a performed by the user's torso when moving the wheelchair forward (DF)
Figure 4:
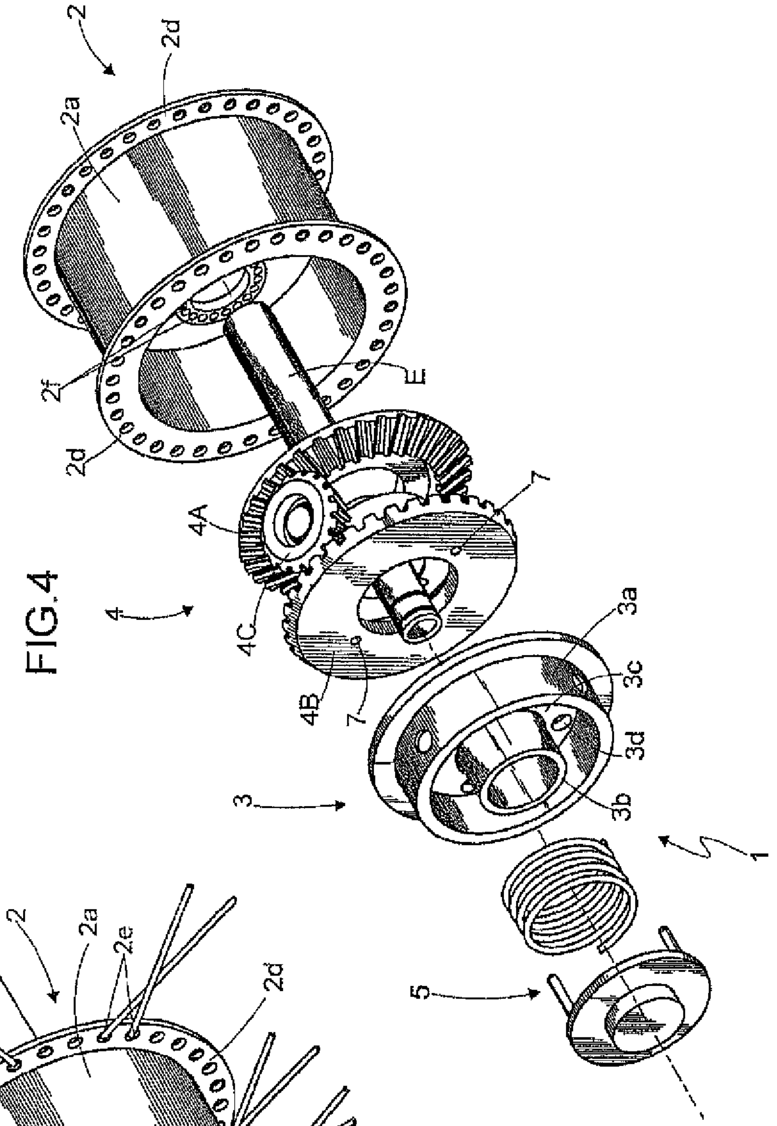
FIG. 4 shows another perspective view of the mechanism, showing the locking device in an exploded view, illustrating the main modules.
Figure 3:
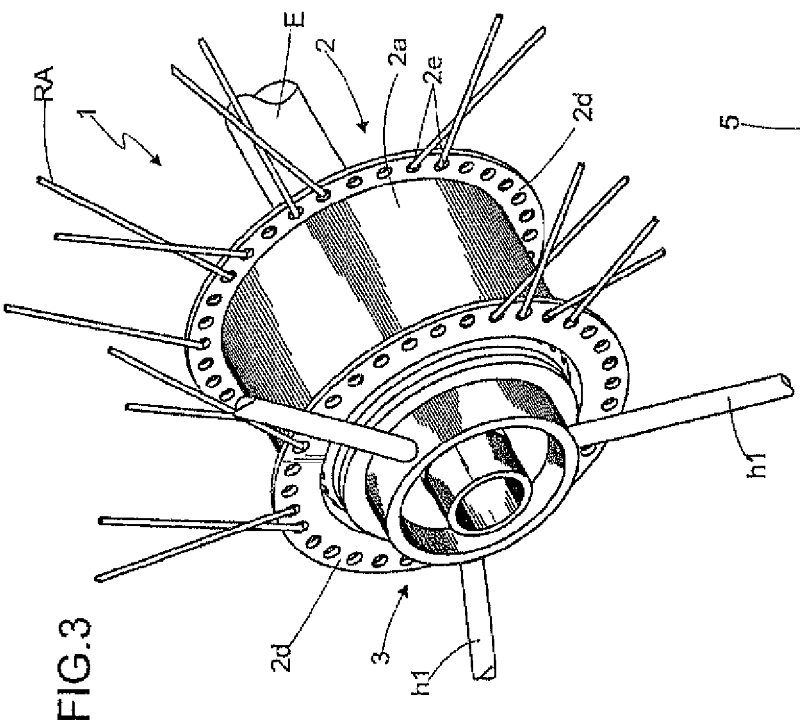
FIG. 3 shows a perspective view of the mechanism and its installation position in relation to the axle of the rear wheels of the chair.
Figure 5:
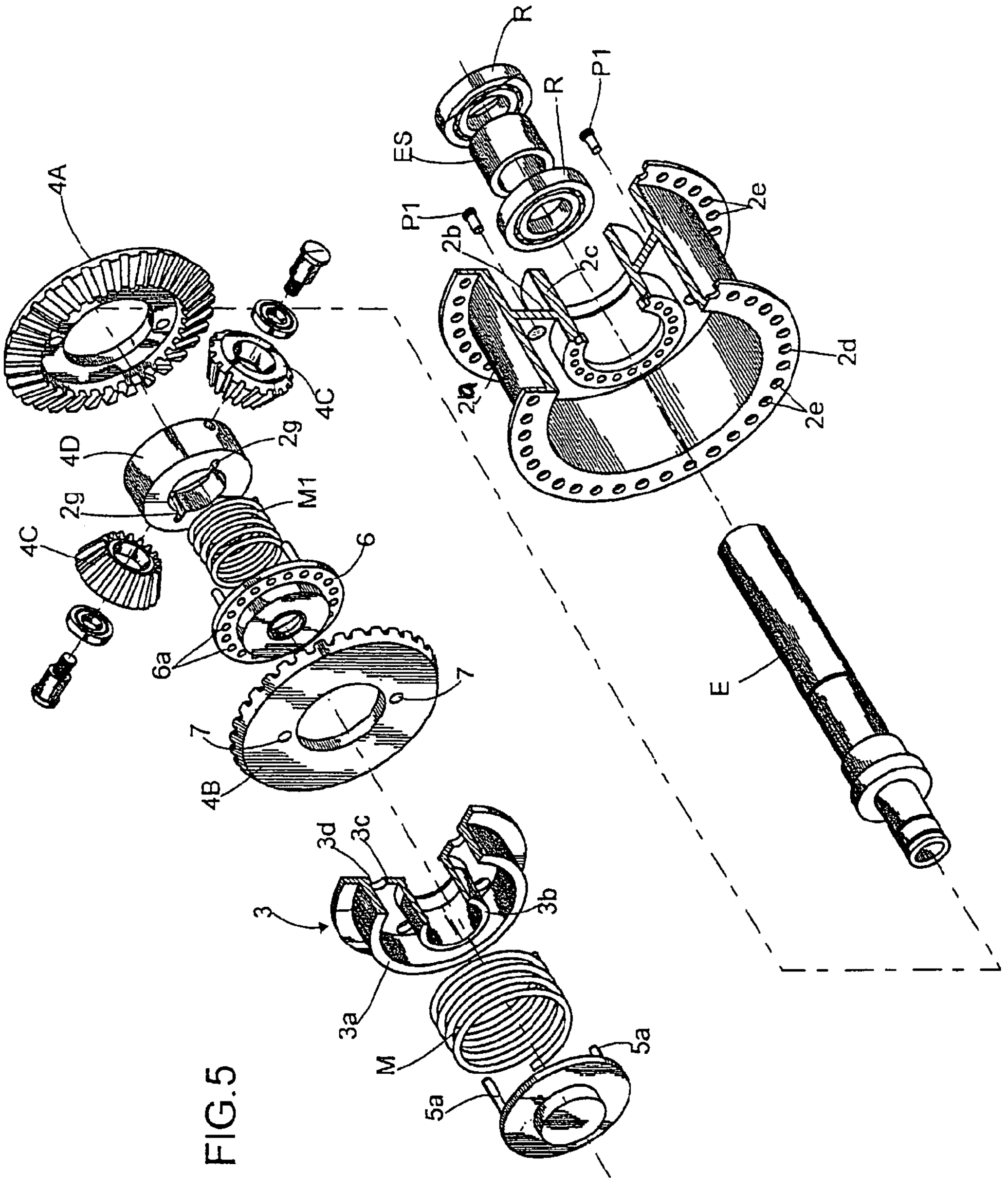
FIG. 5 shows an exploded perspective view of the elements that comprise the reverser mechanism.
Figure 10:
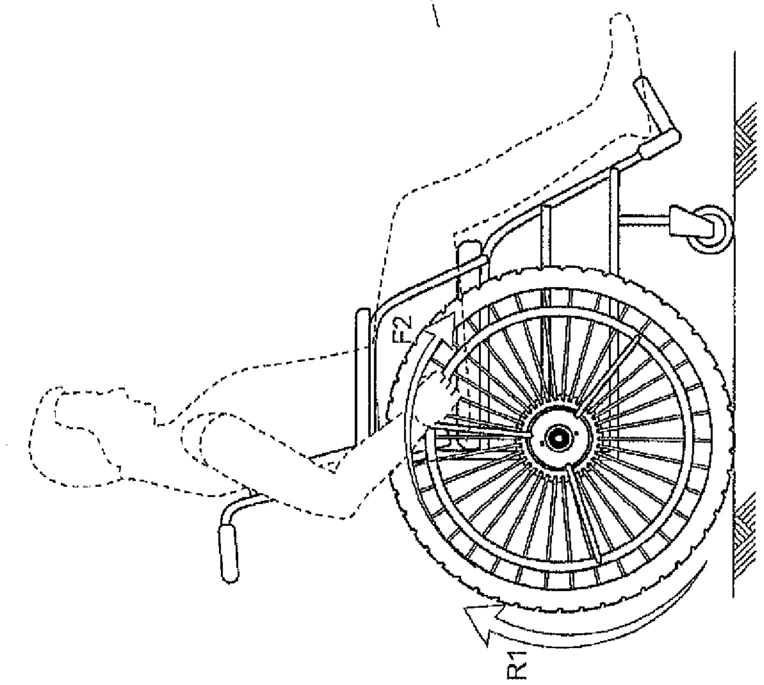

When the lock (5) of the drive module (3) is pressed into the mechanism, the pins (5*a*) push the drive disk (6) that, on its turn, moves on the grooves (4*g*) of the hub (4D), locking its ends to the grooves (2*f*) of the directional rotating module (2), so as to enable the entire set—drive module (3), rotating module (2), and gear set—to form a single block to be moved with a forced (F1) forward (movement in the same direction as the impulsion), defining a wheelchair with usual forward movement (DF) (see FIGS. 1 and 10).

Certainly, when this invention is put to practice, modifications may be introduced to certain details of construction and shape, with no significant deviations from the fundamental principles that are clearly described in the claims. Thus, it is understood that the terminology employed herein is not intended to limit the invention.

The invention claimed is:

1. A reverser mechanism for propelling a wheelchair, the wheelchair having a rear axle on which rear wheels are mounted, and handrims connected to the rear axle for propelling the wheelchair in a forward or reverse direction, the reverser mechanism comprising:

- a directional rotating module connected to each of the rear wheels, respectively, and configured to be mounted on the rear axle,
- a drive module disposed within the directional rotating module and configured to be mounted on the rear axle,
- a set of planetary gears disposed within the directional rotating module, and
- a lock adapted for selectively coupling and decoupling the directional rotating module and the drive module between a coupled state and a decoupled state,
- wherein when the modules are mounted on the rear axle and decoupled from each other in the decoupled state, rotation of the handrims moves the rear wheels in a direction opposite to a direction of rotation of the handrims, and wherein when the modules are coupled to each other in the coupled state, rotation of the handrims moves the rear wheels in the same direction as the direction of rotation of the handrims.

2. The reverser mechanism according to claim 1, wherein the drive module comprises a front cylindrical bearing having an external periphery to which support bars of the handrim are adapted to be fixed, and a cylindrical segment provided internally and concentrically to the front cylindrical bearing and connected to the front cylindrical bearing by a posterior wall of the drive module, wherein locking pins of the lock extend through orifices of the posterior wall, and wherein the lock is supported by a spring disposed between the front cylindrical bearing and the cylindrical segment.

3. The reverser mechanism according to claim 1, wherein the directional rotating module comprises a cylinder provided with an internal wall that is bisected by a short cylindrical segment, said short cylindrical segment having multiple grooves on a front face thereof, wherein internal surface bearings and a spacer are assembled on an interior surface of said short cylindrical segment to center the directional rotating module on the rear axle, wherein ends of the cylinder are equipped with orthogonal flanges that have multiple orifices to receive spokes of the rear wheel, and wherein said internal wall divides an interior of the cylinder into two independent chambers, a front chamber that contains the set of planetary gears which comprises a receiving gear fixed to the internal wall by bolts, and a rear chamber that is empty.

4. The reverser mechanism according to claim 3, wherein the set of planetary gears further comprises a transmission gear which is a mirror image of the receiving gear, said transmission gear and receiving gear being interconnected by two or more pinion satellite gears coupled to a central hub by pins and bearings, wherein the pinion satellite gears are adapted for transmitting a reverse rotating force to the rear wheels when a traction force is applied to the handrim and the modules are in the decoupled state, and wherein the pinion satellite gears are locked between the receiving gear and the transmission gear when the modules are in the coupled state, so that the rear wheels and handrims rotate in the same direction, and wherein a drive disk is configured to be assembled between an internal face of the transmission gear and an end flange of the rear axle.

5. The reverser mechanism according to claim 4, wherein the drive disk has an S-shaped cross-section with two flanges of different diameters, wherein the flange with a larger diameter has multiple grooves that receive ends of the pins of the lock and at least two additional pins that accommodate and slide on grooves of the central hub to engage or disengage the pins of the lock from the grooves on the front face of the short cylindrical segment, and wherein the flange with a smaller diameter acts as a stopper to an expanding spring that is anchored on the end flange of the rear axle.

* * * * *